R. WISHON.
CHAIN TRACK.
APPLICATION FILED JUNE 27, 1918.
1,331,550.
Patented Feb. 24, 1920.
2 SHEETS—SHEET 2.
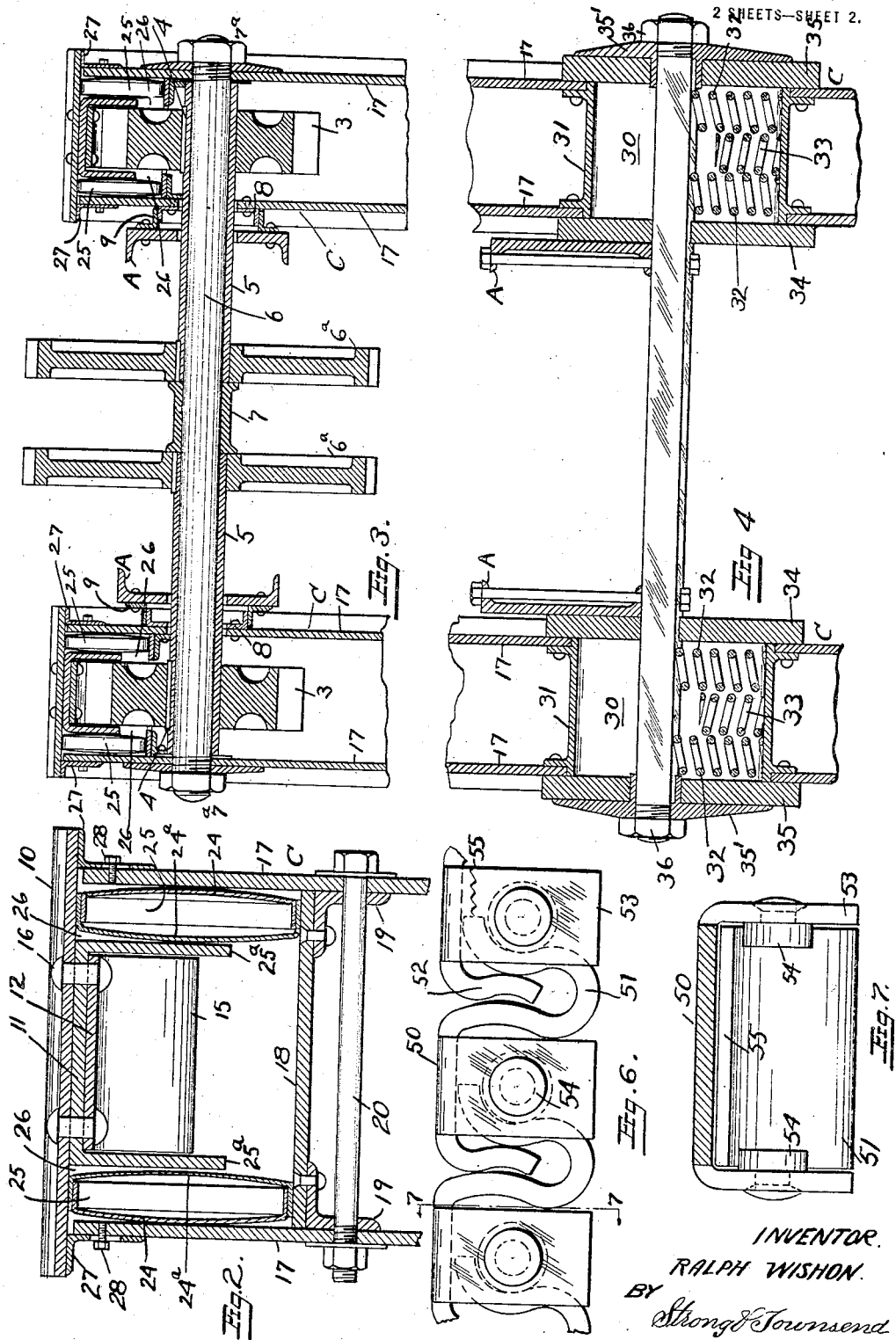
INVENTOR.
RALPH WISHON.
BY Strong & Townsend
ATTORNEYS.

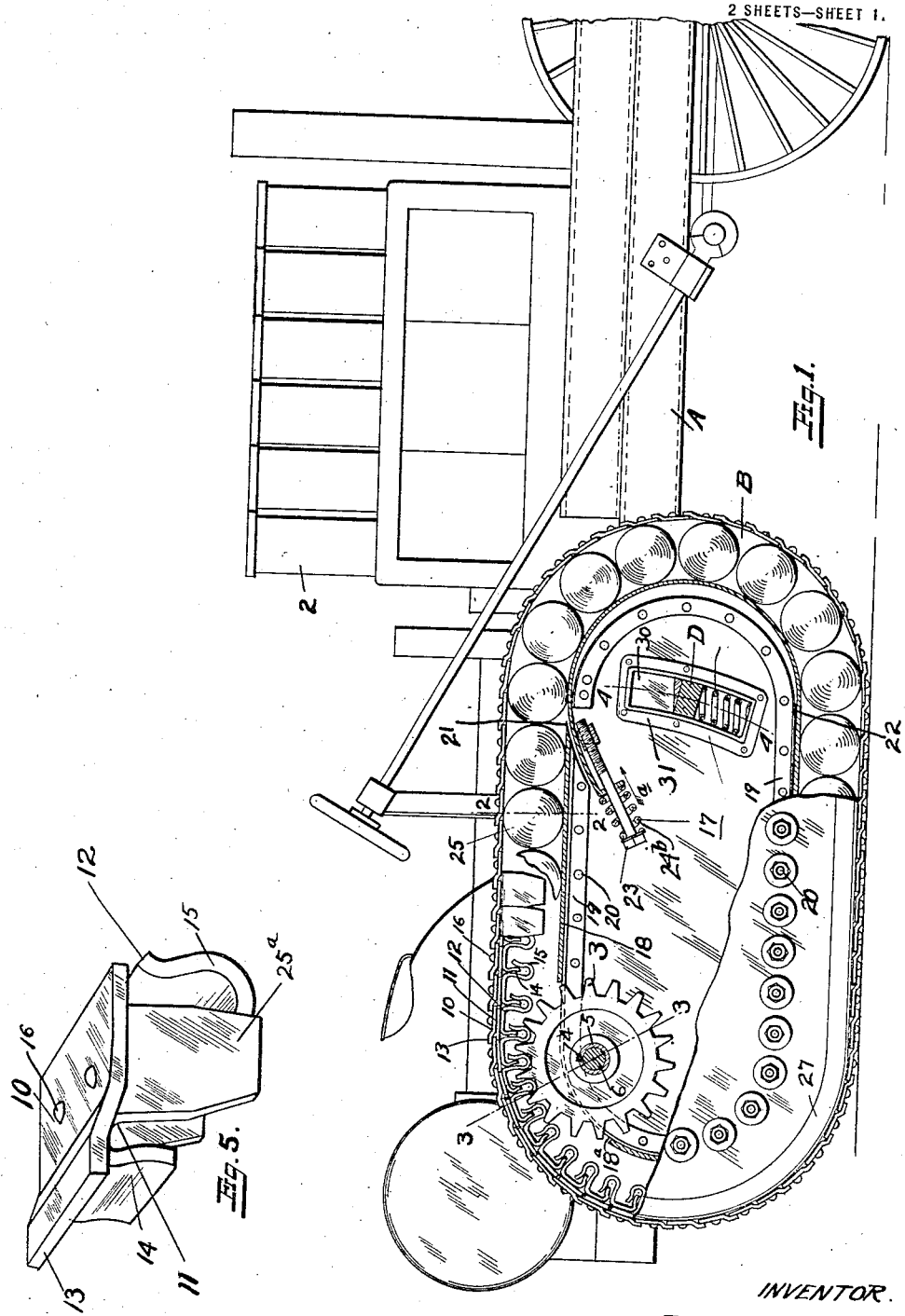

UNITED STATES PATENT OFFICE.

RALPH WISHON, OF SAN FRANCISCO, CALIFORNIA, ASSIGNOR, BY MESNE ASSIGNMENTS, TO THE DAVIS SEWING MACHINE COMPANY, A CORPORATION OF OHIO.

CHAIN-TRACK.

1,331,550.        Specification of Letters Patent.        Patented Feb. 24, 1920.

Application filed June 27, 1918. Serial No. 242,142.

*To all whom it may concern:*

Be it known that I, RALPH WISHON, a citizen of the United States, residing at the city and county of San Francisco and State of California, have invented new and useful Improvements in Chain-Tracks, of which the following is a specification.

This invention relates to a chain construction, and particularly to a chain track for tractors of the endless self-laying track type.

One of the objects of the present invention is to provide a simple, substantial and cheaply manufactured combination chain and track for tractors and the like in which the links interlock with each other in such a manner that pins or other connections subject to wear and tear may be entirely eliminated. Another object of the invention is to provide a novel form of supporting frame for the chain track; also an anti-friction roller support adapted to be interposed between the supporting frame and the track, together with means for automatically taking up slack or wear in the track. Another object of the invention is to provide a novel mounting for the track supporting frame with relation to the tractor proper and also to provide means for excluding dust and grit from the track and the anti-friction support to reduce wear to a minimum and permit lubrication of the moving parts. Further objects will hereinafter appear.

The device consists of the parts and the construction, combination and arrangement of parts as hereinafter more fully described and claimed, having reference to the accompanying drawings, in which—

Figure 1 is a side elevation of a tractor showing the application of the invention.

Fig. 2 is an enlarged cross section of the track and the supporting frame taken on the line 2—2 of Fig. 1.

Fig. 3 is a cross section on the line 3—3 of Fig. 1.

Fig. 4 is a cross section on the line 4—4 of Fig. 1.

Fig. 5 is a perspective detail view of one of the track links.

Fig. 6 is a side elevation of a portion of the link track showing a modification of the same.

Fig. 7 is a section on the line 7—7 of Fig. 6.

Referring to the drawings in detail, A indicates the main frame of a tractor, 2 the engine and 3 a pair of rear driving sprocket wheels to which power is transmitted from the engine in any suitable manner. These sprocket wheels are mounted one on each side of the main frame of the tractor and are provided for the purpose of driving the endless chain tracks generally indicated at B.

Each sprocket wheel is secured by means of keys 4 to a sleeve member 5, said sleeves being in turn journaled upon a shaft 6 which extends crosswise of the main frame, as shown in Fig. 3. Secured on the inner end of each sleeve 5 is a driving gear 6$^a$ and separating said gears and the sleeves 5 is a spacer sleeve 7. The endless chain tracks are, in this instance, carried by trucks or frames C. These frames are arranged one on each side of the main frame and they are pivotally attached thereto by male and female trunnion bearings, generally indicated at 8 and 9, the bearings 8 being secured to the inner side plates 17 of the frames while the bearings 9 are secured to the exterior sides of the main frame A. The axle 6 is secured against endwise removal by nuts 7$^a$ and it therefore not only serves as a tie-rod to secure the frames against endwise removal but it also serves as a bearing for the sleeves 5 and the gears carried thereby.

The chain track B, together with the supporting frames therefor, forms the real subject-matter of the present invention and the detailed description of the driving mechanism so far specified merely shows one manner of transmitting power from the engine to operate or drive the endless tracks. The links forming the chain track are more particularly shown in Figs. 1, 2 and 5. From these drawings it can be seen that each link interlocks with the other and that each link consists in this instance of three plates, to-wit, an exterior plate or shoe 10, an intermediate plate 11 and a tooth plate 12. The shoe plate 10 is offset or raised at the rear end, as at 13, to overlap the adjacent shoe of the succeeding or following link, while the tooth plate is provided with a hook-shaped member 14 on the rear end and a tooth-shaped member 15 on the forward end, the hook 14 on each link interlocking or entering the tooth-shaped extension on each succeeding link. The intermediate plate 11 forms a spacer between the shoe and the tooth plate 12 and it also forms a support for the rear end of the link immediately ahead, that is, each plate 11 is extended forwardly so far that it passes between the rear end of the shoe and the top of the rear end of the tooth plate of the link immediately ahead thereof. It therefore not only forms an interlocking member and a support for the rear end of each forward link, but it also forms a lock to prevent the hook 14 of each link from becoming disengaged with the tooth 15 of each succeeding link.

While the present invention shows each link as being constructed of three separate pieces which are secured together by means of rivets 16 or like means, I wish it understood that each link section may be otherwise constructed as long as the shape here shown is substantially retained. The present link may be constructed of scrap pieces of boiler and ship plate and is therefore not only economical as far as material cost is concerned, but it is also rigid and substantial as the material employed is high grade and the interlocking feature shown permits each link to support and brace the other when they are subjected to load or strain.

The teeth of the sprocket wheels 3 pass up between the teeth sections 15 of the individual links and a driving connection is in this manner formed which permits power to be transmitted from the sprockets to the individual chains. For the purpose of supporting each chain track as a whole I have provided a frame structure generally indicated at C.

This frame comprises a pair of side plates 17 having an exterior shape or contour substantially as shown in Fig. 1. These plates are spaced apart by a track plate 18 which is rigidly secured to angle irons 19, the plates 17 being secured to the track plate 18 and the angle irons 19 by means of bolts 20, as shown in Fig. 2. This construction permits both or either of the side plates 17 to be entirely removed without disturbing any of the remaining mechanism. The track plate 18 commences at a point 21 (see Fig. 1) and then passes around, as shown, to a point 22, it being riveted or otherwise secured to the angle irons 19 throughout its length from the point 21 to the point 22. It is entirely free with relation to the angle irons while passing around the forward end of the frame and its free end is then passed under the point 21 and slidably secured by a guiding bolt 23, a spring 24$^b$ being interposed between the head of said bolt and the end of the plate 18 to force the plate in the direction of arrow $a$. As the track plate as a whole is constructed of spring steel, it can readily be seen that it will assume an extended interspaced position with relation to the curved forward end of the angle irons 19, in this manner taking up any play which may exist in the track chain as a whole.

Interposed between the shoe plates 10 of the links and the track plate 18 is a plurality of rollers 25. There are two sets of rollers employed, one set on each side of the tooth plates 12. The rollers are in this instance constructed of two disks 24 and 24$^a$ adapted to telescope one within the other (see Fig. 2). This method of constructing the rollers permits the same to be stamped from waste sheet material and it not only produces a rigid roller but also an exceedingly light roller, the only portion of each roller which is subject to wear being the outer section 24$^a$ which may be removed and renewed whenever required. The inner section 24 of each roller is, practically speaking, merely a support for the outer section 24$^a$ and should therefore outlast many sets of exterior sections.

The rollers are also slightly cone-shaped as far as the sides are concerned to reduce frictional contact between the individual rollers and the side plates 17, and they are also held out of frictional engagement with the individual chain links, first, due to the cone-shaped face or side construction shown, and, secondly, by side plates 25$^a$ formed on each link. These side plates are formed integral with the intermediate plates 11 and they serve in conjunction with the side plates 17 the function of maintaining a pair of interspaced channels or raceways 26 for the reception of the rollers 25. The side plates 17 barely clear the under faces of the shoes 10 of each link and they therefore serve the function of entirely inclosing the roller raceways 26 and the toothed portions of the individual links, thus excluding to a large extent dust or grit which might otherwise enter.

For the purpose of further guarding against admission of foreign material I have secured a pair of dust guards 27 along the lower edge of each side plate 17. These dust guards are slidably mounted with relation to the side plates and frictionally engage the under sides of the shoes, the slidable mounting permitting each dust guard to be adjusted and rigidly secured by means of screws 28, this feature being only necessary to permit taking up of wear or to reduce friction between the guards and the shoes, if friction should be too great.

The main side plates 17 are pivotally mounted on the trunnion bearings, thus permitting the forward end of each track supporting frame to swing freely about the bushings and the axle 6 when riding over obstructions or uneven ground formation, the track plates 18 being slotted, as at 18$^a$, to permit the driving sprockets 3 to pass through the track plates and engage the teeth formations on the interior side of the chain tracks. For the purpose of supporting the forward end of each track frame with relation to the main frame A of the tractor a rigid cross bar or shaft D has been provided. This is rigidly secured to the under side of the main frame A and extends outwardly through arcuated slots 30 formed in a casting 31 secured between the side plates 17 of each track frame. Two or more springs, preferably three, as shown in Fig. 4, are inserted between the shaft D and the castings 31 to form a resilient connection for the track frames with relation to the main frame. The two exterior springs 32 shown take care of any normal load, while the shorter intermediate spring 33 serves as a bumper or auxiliary spring to take care of excessive loads when applied. Lateral movement of the forward ends of the trucks is prevented by providing wooden guide blocks, such as shown at 34 and 35, the blocks 34 being secured to the shaft D and the main frame A, while the exterior blocks are secured to the flanged bushings 35' which are secured in place by nuts 36 placed on the outer ends of the shaft.

By referring to Fig. 6 it will be seen that a modification of the flexible track has been shown. Each link is, in this instance, made of one piece of metal which not only serves as a support for a tread member, but also as a tooth and a connecting member. The tread portion of the plate is indicated at 50, the tooth portion at 51 and the hook or connecting portion at 52. The tread portion is, in this instance, provided with two inwardly projecting side plates 53, and studs projecting said plates, as at 54, serve the function of locking the hook sections 52 against endwise removal with relation to the teeth 51. The upper portion of each tooth section 51 is curved or bent, as at 55. Each tooth section therefore partly overlaps the studs 54 and thereby prevents the links from being accidentally or otherwise disconnected when running around the supporting frames. I wish it understood that while the link here shown is not provided with a shoe, it is obvious that a shoe or tread may be suitably attached thereto, if desired.

Chain tracks constructed as here shown are not only simple and substantial but should outwear ordinary chain links many times due to the fact that the movement between the several links in passing around the curved ends of the supporting frames is nothing more or less than a rocking movement, and, secondly, to the fact that cross pins and other connections subject to wear are entirely eliminated. Another feature which should increase the life of the structure as a whole and further eliminate wear is the fact that the side plates 17, practically speaking, form a grit-proof housing for the chain tracks and the driving mechanism, thereby permitting the roller raceways and the teeth formations on the links to be thoroughly lubricated at all times. Less power should be consumed with the present arrangement as friction between each individual link is reduced to a minimum and also because the anti-friction rollers provided may be large in diameter and are permitted to run freely in an endless procession around the raceways formed for their reception, all wear or slackness being automatically taken up by the free, extensible and spring-actuated end of the track plate 18. Another feature of the invention is the accessibility of all parts. For instance, if it is desired to uncover the chain track it is only necessary to remove the outer side plate 17 by taking out the bolts 20. This leaves the side plate entirely free to be removed and therefore permits the interior parts to be inspected or adjusted. Similarly, if it is desired to remove the driving sprockets or the rear shaft 6 supporting the same, this can be accomplished by merely removing one of the nuts 7ª by which it is secured. Removal of either nut permits the shaft 6 to be pulled out endwise and therefore leaves the bushings 5 free for removal. These may be removed as both the sprockets 3 and the gears 6ª are merely secured thereto by free fitting keys similar to a spline connection. The parts are therefore readily accessible for repair, adjustment or otherwise, and it certainly must be admitted that where features of this nature are involved better care will be given the machinery due to the fact that all parts can be readily inspected or removed whenever desired without too much loss of time in disassembling.

The materials and finish of the several parts may be such as the experience and judgment of the manufacturer may dictate, and while I have here shown the invention as applied to a standard form of tractor I wish it understood that it may be attached to any truck or ordinary automobile.

Having thus described my invention, what I claim and desire to secure by Letters Patent is:

1. A link track for tractors comprising a plurality of interconnected links, each of said links comprising a tread section and a hook-shaped tooth section, and means on each tooth section for interconnecting the links.

2. A link track for tractors comprising a plurality of interconnected links, a tread section on each link, a tooth member on each link and a connecting member on each link adapted to interlock with the tooth on the succeeding link, said tooth and connecting member forming a flexible connection between each link.

3. A link track for tractors comprising a plurality of interconnected links, a tread section on each link, a hook-shaped tooth member on each link and a hook-shaped connecting member on each link adapted to interlock with the hook-shaped tooth on the succeeding link to flexibly connect the links.

4. A link track for tractors comprising a plurality of interconnected links, a tread section on each link, a hook-shaped tooth member on each link, a connecting member on each link adapted to interlock with the hook-shaped tooth on the succeeding link to flexibly connect the links, and means for locking the connecting member against disengagement with the hook-shaped tooth.

5. A link track for tractors comprising a plurality of interconnected links, a tread or shoe member on each link, a hook-shaped tooth on one end of each link, a hook-shaped connecting member adapted to interlock with the hook-shaped tooth on a succeeding link and a projection on each link adapted to pass under the shoe section and over the connecting hook of each link to lock the connecting hook member against disengagement with the hook-shaped tooth.

6. A link track for tractors comprising a plurality of interconnected links, each of said links comprising a tread plate, an intermediate plate and a tooth plate, means securing said plates together, a U-shaped tooth on one end of the tooth plate, and a hook-shaped member on the opposite end of the tooth plate adapted to interlock with the U-shaped tooth of a succeeding link.

7. A link track for tractors comprising a plurality of interconnected links, each of said links comprising a tread plate, an intermediate plate and a tooth plate, means securing said plates together, a U-shaped tooth on one end of the tooth plate, a hook-shaped member on the opposite end of the tooth plate adapted to interlock with the U-shaped tooth of a succeeding link, and means permitting a rocking movement of the hook-shaped member within the U-shaped tooth, said means also adapted to secure the hook-shaped member against endwise removal with relation to the U-shaped tooth.

8. A link track for tractors comprising a plurality of interconnected links, each of said links comprising a tread plate, an intermediate plate and a tooth plate, means securing said plates together, a U-shaped tooth on one end of the tooth plate, a hook-shaped member on the opposite end of the tooth plate adapted to interlock with the U-shaped tooth of a succeeding link, a track supporting frame, an endless track on said frame, and a plurality of rollers arranged on each side of said track adapted to engage the under sides of the tread sections of the links.

9. A link track for tractors comprising a plurality of interconnected links, each of said links comprising a tread plate, an intermediate plate and a tooth plate, means securing said plates together, a U-shaped tooth on one end of the tooth plate, a hook-shaped member on the opposite end of the tooth plate adapted to interlock with the U-shaped tooth of a succeeding link, a track supporting frame, an endless track on said frame, a plurality of rollers arranged on each side of said track adapted to engage the under sides of the tread sections of the links, and means on said track for automatically taking up any slack in the chain.

10. The combination with the main frame of a tractor and an endless chain track supporting frame mounted on each side thereof, of a pivotal bearing connection between each supporting frame and the main frame, a shaft extending cross-wise of the main frame and through said pivotal bearing connections, securing the track frames against lateral movement with relation to the main frame and a driving member extending through each pivotal connection and turnable independent thereof, adapted to transmit power to drive an endless track carried by each track frame.

11. The combination with the main frame of a tractor and an endless chain track supporting frame mounted on each side thereof, of a bearing member secured on each side of the main frame, a bearing member secured on each track supporting frame and turnable about the first-named bearing members, means for securing each track supporting frame against end-wise movement on the bearing members and a driving member extending through the respective bearing members and turnable independent thereof, adapted to transmit power to drive an endless track carried by each track frame.

12. The combination with the main frame of a tractor and a rear driving shaft of a pair of driving sprockets arranged one on each end of said shaft, a pair of track supporting frames pivotally mounted on said shaft, one on each side of the main frame, an endless track in each frame, an endless flexible link track supported by said first-named track, teeth carried by each individual link forming the flexible track adapted to engage the teeth of the driving sprockets, said teeth also forming interlocking members between the individual links of the flexible track, and anti-friction bearing members interposed between the first-named track and the flexible track.

13. The combination with the main frame of a tractor and a rear driving shaft of a pair of driving sprockets arranged one on each end of said shaft, a pair of track supporting frames pivotally mounted on said shaft, one on each side of the main frame, an endless track in each frame, an endless flexible link track supported by said first-named track, teeth carried by each individual link forming the flexible track adapted to engage the teeth of the driving sprockets, said teeth also forming interlocking members between the individual links of the flexible track, a pair of side plates carried by each frame forming a closure for the driving sprockets and the teeth on the flexible track, anti-friction rollers positioned on each side of the teeth forming a pair of endless raceway supports for each flexible track, said side plates forming a guide for one side of each raceway and means on each link forming a guide on the opposite side of each raceway.

14. An endless self-laying track support for tractors comprising a stationary track, an endless roller raceway arranged on each side of said track, an endless link track supported by said raceways, a pair of side plates forming a closure for said raceways, teeth formed on the individual links of the flexible links of the flexible link track, said teeth being disposed between the roller raceways and a driving sprocket journaled in the frame between the raceways and the exterior side plates adapted to engage the teeth on the links.

15. An endless self-laying track support for tractors comprising a stationary track, an endless roller raceway arranged on each side of said track, an endless link track supported by said raceways, a pair of side plates forming a closure for said raceways, teeth formed on the individual links of the flexible link track, said teeth being disposed between the roller raceways, a driving sprocket journaled in the frame between the raceways and the exterior side plates adapted to engage the teeth on the links, and means on the stationary track for automatically taking up any slack in the flexible track.

16. An endless self-laying track support for tractors comprising a stationary track, said track having a flexible semi-circular end which passes under a stationary portion of the track, spring-actuated means adapted to normally extend the semi-circular flexible end of the track, a flexible endless link track surrounding the stationary track, and anti-friction bearing members interposed between the flexible link track and the stationary track.

17. The combination with the main frame of a tractor and a driving shaft carried thereby of a driving sprocket arranged on each end of said shaft, a pair of endless self-laying track supporting frames pivotally mounted on the shaft, one on each side of the main frame, an endless link track supported by each frame, means for transmitting power from the sprockets to drive said link tracks, a stationary shaft secured to the main frame extending through arcuated slots formed in the track supporting frames, springs disposed in said arcuated slots between the stationary shaft and the main frame and guide blocks carried by the shaft engageable with each side of the track frames.

18. The combination with the main frame of a tractor and a driving shaft carried thereby of a driving sprocket arranged on each end of said shaft, a pair of endless self-laying track supporting frames pivotally mounted on the shaft, one on each side of the main frame, an endless link track supported by each frame, means for transmitting power from the sprockets to drive said link tracks, a stationary shaft secured to the main frame extending through arcuated slots formed in the track supporting frames, springs disposed in said arcuated slots between the stationary shaft and the main frame, a stationary track in each frame, each track having an extensible section, a pair of endless roller raceways formed one on each side of each stationary track, rollers in said raceways supporting the link tracks, and means for automatically extending the extensible section of each stationary track to automatically take up any slack in the link tracks.

19. The combination with the main frame of a tractor and an endless chain track supporting frame mounted on each side thereof of a pivotal bearing connection between each supporting frame and the main frame, and a shaft extending crosswise of the main frame and through said pivotal bearing connections securing the track frames against lateral movement with relation to the main frame.

20. The combination with the main frame of a tractor and an endless chain track supporting frame mounted on each side thereof of a pivotal bearing connection between each supporting frame and the main frame, a shaft extending crosswise of the main frame and through said pivotal bearing connections securing the track frames against lateral movement with relation to the main frame, a pair of sleeve shafts journaled on said shaft, a driving sprocket carried by each sleeve shaft engageable with each chain track and means for driving each sleeve shaft.

21. The combination with the main frame of a tractor and an endless chain track supporting frame mounted on each side thereof of a drum-shaped bearing member secured one on each side of the main frame, a similar shaped bearing member secured on each track supporting frame, said bearing members being supported in the first-named bearing members and turnable therein to form a pivotal connection between each track supporting frame and the main frame, a pair of sleeve shafts extending through the respective bearing members, means for transmitting power to each sleeve, a driving sprocket secured on the outer end of each sleeve, adapted to transmit power to an endless flexible track carried by each track supporting frame and a shaft extending through the sleeve shafts, adapted to secure the track supporting frames against endwise movement on their respective drum-shaped pivotal bearing supports.

In testimony whereof I have hereunto set my hand in the presence of two subscribing witnesses.

RALPH WISHON.

Witnesses:
 JOHN H. HERRING,
 W. W. HEALEY.